Nov. 4, 1924.
F. M. BOYNTON
WHEEL
Filed July 23, 1923
1,514,422
2 Sheets-Sheet 1
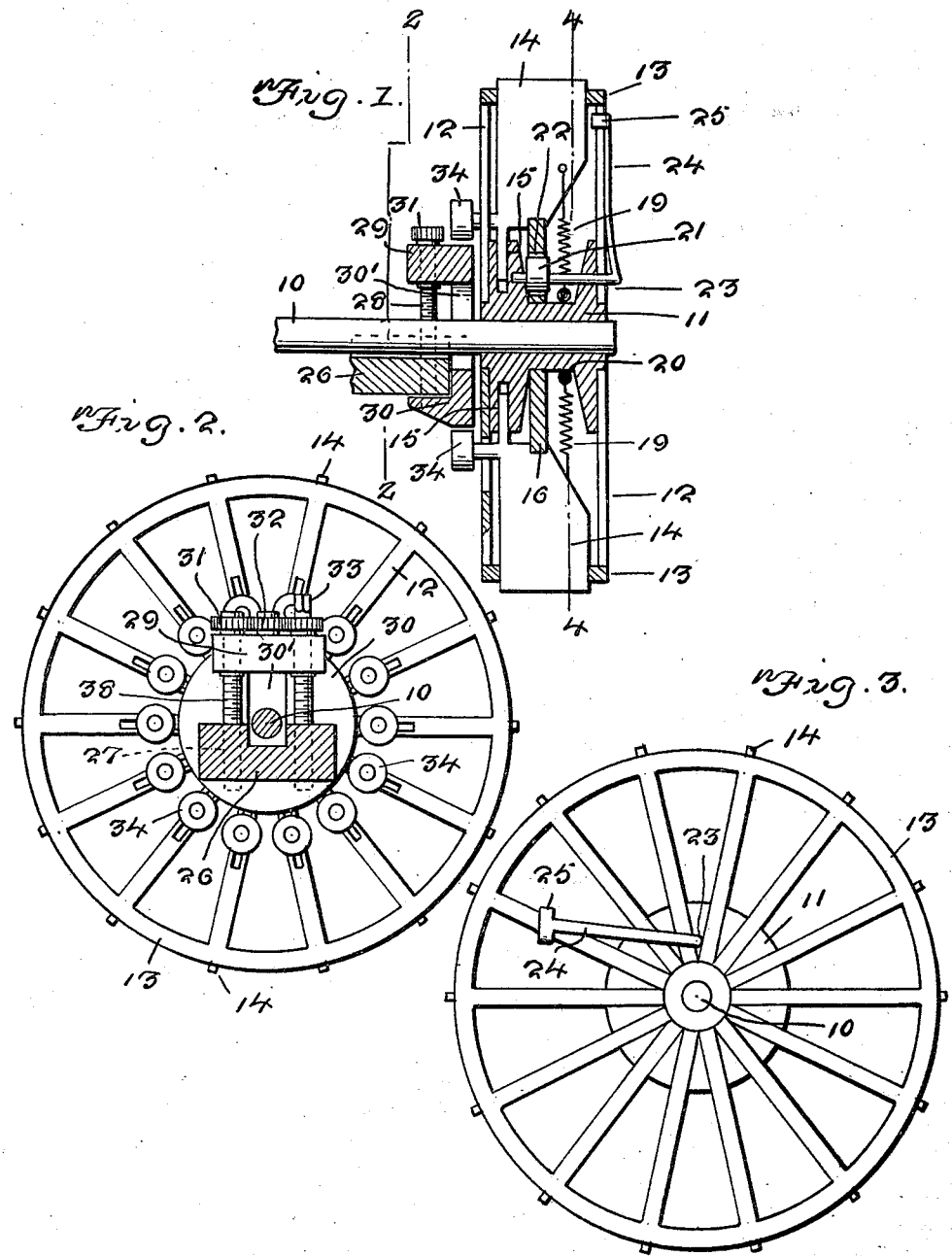

Nov. 4, 1924.
F. M. BOYNTON
WHEEL
Filed July 23, 1923
1,514,422
2 Sheets-Sheet 2
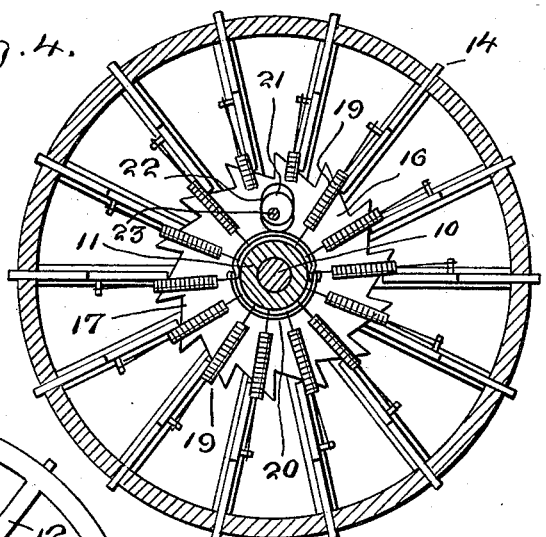
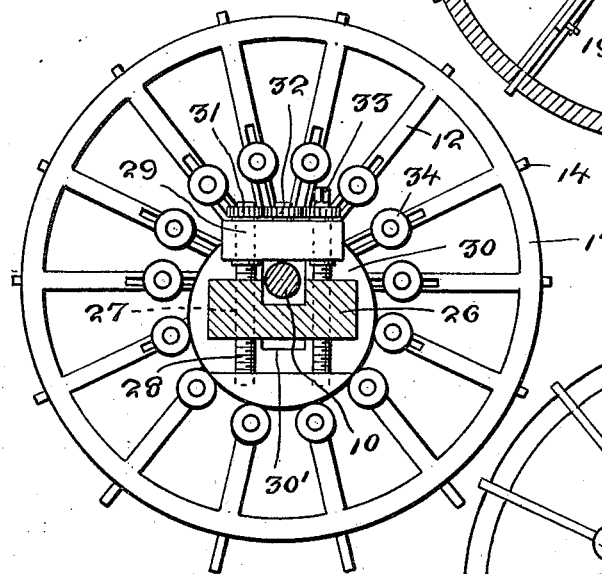
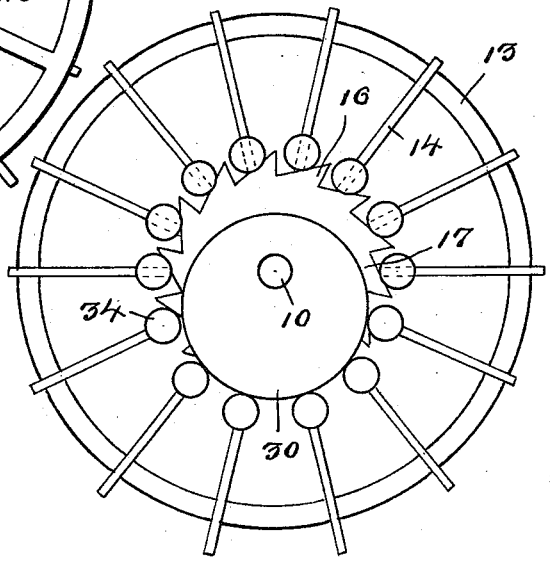
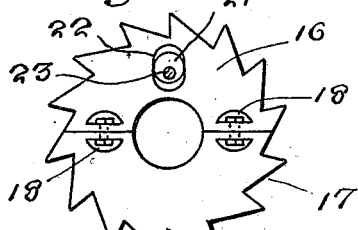
Frank M. Boynton
INVENTOR
BY Victor J. Evans
ATTORNEY
WITNESS:

Patented Nov. 4, 1924.

1,514,422

UNITED STATES PATENT OFFICE.

FRANK M. BOYNTON, OF SOLON, MAINE.

WHEEL.

Application filed July 23, 1923. Serial No. 653,327.

*To all whom it may concern:*

Be it known that I, FRANK M. BOYNTON, a citizen of the United States, residing at Solon, in the county of Somerset and State of Maine, have invented new and useful Improvements in Wheels, of which the following is a specification.

This invention relates to improvements in traction wheels and has for an object the provision of a wheel which may be adjusted to provide proper traction when travelling over soft or muddy surfaces, or arranged to provide a smooth tread when travelling over roads, whereby injury to the latter is prevented.

Another object of the invention is the provision of a wheel of this character which includes means for cleaning the traction elements, so that accumulation of mud and dirt upon the tread will be prevented and the traction elements kept in proper condition.

With the above and other objects in view, the invention further includes the following novel features and details of construction, to be hereinafter more fully described, illustrated in the accompanying drawings and pointed out in the appended claims.

In the drawings:—

Figure 1 is a sectional view of a wheel constructed in accordance with the invention.

Figure 2 is an elevation partly in section, the view being taken substantially on the line 2—2 of Figure 1.

Figure 3 is an elevation looking at the opposite side of the wheel.

Figure 4 is a section on the line 4—4 of Figure 1.

Figure 5 is a view similar to Figure 2 but showing the traction elements at their innermost position.

Figure 6 is a like view illustrating the operation of the traction elements.

Figure 7 is a detail view of the adjusting disk.

Referring to the drawings in detail wherein like characters of reference denote corresponding parts, the reference character 10 indicates an axle, such for example as the axle of a tractor, to which the wheel is shown as applied. Secured upon this axle is a hub 11 and connected to this hub by means of laterally spaced spokes 12 is a rim 13.

This rim is provided with spaced openings for the passage of traction elements 14, the inner ends of the latter being slidingly mounted in sockets 15 provided in the hub 11.

The sockets 15 are offset to one side of the transverse center of the hub 11 and the hub is centrally reduced, while rotatably mounted upon this reduced portion is a disk 16 having spaced inclined projections 17 extending around its periphery. The disk 16 is preferably split and secured together as shown at 18, whereby it may be mounted upon the reduced portion of the hub 11.

The inclined projections 17 engage the inner ends of the traction elements 14 and in order to hold these traction elements yieldingly in such engagement, the traction elements have connected thereto the outer ends of springs 19, the inner ends of which are connected to a ring 20 which encircles the hub. The projections 17 thus limit the inward movement of the traction elements 14.

This inward movement is regulated through the adjustment of the disk 16 and for this purpose there is provided an eccentric 21 which engages the walls of an opening 22 provided in the disk 16. The eccentric is mounted upon a rod or shaft 23, to the outer end of which is connected the inner end of a lever 24 and the outer end of the latter is provided with means indicated at 25 for removable engagement with any one of the spokes 12 upon one side of the wheel. By this means the eccentric 21 may be rotated to adjustably rotate the disk 16 so as to cause the traction elements 14 to engage the inclined projections 17 at different points and thus permit the traction elements to move sufficiently inward to provide a smooth tread surface for the wheel or to force all of the traction elements outward to the position shown in Figure 2.

The reference character 26 indicates a stationary member which may extend from the frame or some convenient part of the tractor. This member is provided with threaded openings 27 which receive the ends of threaded rods 28. These rods pass through a block 29 which is carried by a disk 30 and are swiveled in this block so that by rotating the rods 28 the member 26 and the block 29 will be relatively adjusted. The disk is provided with an opening 30' for the passage of the axle 10. Mounted upon the upper ends of the threaded rods 28 are pinions 31 which are engaged by a pinion 32 and one of the rods 28 is provided with a rectangular extension 33 for engagement by a suitable tool or lever. Thus rotation of this rod will through the idler pinion 32 rotate the other rod and provide adjustment for the disk 30.

The traction elements 14 carry laterally disposed rollers 34 which engage the periphery of the disk 30 and when this disk is arranged concentrically with respect to the rim of the wheel, no movement will be imparted to the elements 14, but by adjusting the disk 30 eccentrically as shown in Figure 6, the elements 14 will be successively moved outward and inward, outward movement being effected by the disk 30 and inward movement under the action of the springs 19. This movement will serve to effectually remove dirt or other matter collected by the elements 14.

The invention is susceptible of various changes in its form, proportions and minor details of construction and the right is herein reserved to make such changes as properly fall within the scope of the appended claims.

Having described the invention what is claimed is:—

1. A wheel embodying a hub, a rim, a plurality of independently movable spring actuated traction elements extending from the hub and passing through the rim, adjustable means for moving the traction elements against the action of the springs and adjustable means for limiting their inward movement.

2. A wheel embodying a hub, a rim, a plurality of independently movable spring actuated traction elements extending from the hub and passing through the rim, adjustable means for moving the traction elements against the action of the springs and rotatably adjustable means for limiting their inward movement.

3. A wheel embodying a hub, a rim, a plurality of independently movable spring actuated traction elements extending from the hub and passing through the rim, adjustable means for moving the traction elements against the action of the springs and adjustable means for limiting their inward movement and means detachably engaging the spokes of the wheel for holding the last mentioned means in adjusted position.

4. A wheel embodying a hub, a rim, a plurality of independently movable spring actuated traction elements extending from the hub and passing through the rim, adjustable means for moving the traction elements against the action of the springs, a disk rotatable upon the hub, a plurality of inclined projections around the edge of the disk for engagement with the traction elements to limit their inward movement and means for holding the disk in position.

5. A wheel embodying a hub, a rim, a plurality of independently movable spring actuated traction elements extending from the hub and passing through the rim, adjustable means for moving the traction elements against the action of the springs, a disk rotatable upon the hub, a plurality of inclined projections around the edge of the disk for engagement with the traction elements to limit their inward movement, an eccentric engaging the disk, whereby the latter may be rotated and a spoke engaging arm operatively connected to the eccentric to hold the latter against movement.

6. A wheel embodying a hub, a rim, a plurality of independently movable spring actuated traction elements extending from the hub and passing through the rim, a radially adjustable disk, rollers carried by the traction elements and engaging the disk, means whereby the disk may be adjusted to move the traction elements outward and adjustable means for limiting the inward movement of the traction elements.

In testimony whereof I affix my signature.

FRANK M. BOYNTON.